United States Patent
Oostman

(10) Patent No.: US 7,883,301 B2
(45) Date of Patent: Feb. 8, 2011

(54) SAFETY PROTECTION DEVICE FOR ELECTRICAL CIRCUIT PANEL BOXES AND THE LIKE

(76) Inventor: Jeff Oostman, 4321 W. 133rd Ave., Crown Point, IN (US) 46307

( * ) Notice: Subject to any disclaimer, the term of this patent is extended or adjusted under 35 U.S.C. 154(b) by 1246 days.

(21) Appl. No.: 11/454,017

(22) Filed: Jun. 15, 2006

(65) Prior Publication Data
US 2007/0284984 A1  Dec. 13, 2007

(51) Int. Cl.
*B23B 47/34* (2006.01)
(52) U.S. Cl. .................. 408/67; 408/72 B; 408/87
(58) Field of Classification Search .......... 408/72 B, 408/115 B, 115 R, 241 B, 241 G, 67, 87
See application file for complete search history.

(56) References Cited

U.S. PATENT DOCUMENTS

| | | | | |
|---|---|---|---|---|
| 710,257 | A * | 9/1902 | De Luuew | 408/76 |
| 979,273 | A * | 12/1910 | Ferries | 269/305 |
| 2,661,641 | A * | 12/1953 | Wood, Jr. | 408/76 |
| 2,861,484 | A * | 11/1958 | Rance | 408/115 R |
| 3,049,031 | A * | 8/1962 | Carstens | 408/76 |
| 3,340,915 | A * | 9/1967 | Passer | 408/72 R |
| 3,907,452 | A * | 9/1975 | Tripp | 408/56 |
| 3,992,122 | A * | 11/1976 | Maxey | 408/72 B |
| 4,538,354 | A * | 9/1985 | Smolik | 408/72 B |
| 4,955,984 | A | 9/1990 | Cuevas | 408/67 |
| 5,087,158 | A * | 2/1992 | Devine | 408/67 |
| 5,201,615 | A * | 4/1993 | Patterson et al. | 408/87 |
| 5,415,502 | A * | 5/1995 | Dahlin | 408/72 B |
| 5,664,913 | A * | 9/1997 | Scholz | 408/72 B |
| 5,888,034 | A * | 3/1999 | Greenberg | 408/115 R |
| 5,989,025 | A * | 11/1999 | Conley | 433/76 |
| 6,109,839 | A * | 8/2000 | Thomas | 408/1 R |
| 6,186,707 | B1 * | 2/2001 | Kain | 408/1 R |
| 6,217,006 | B1 | 4/2001 | Muller | 254/134.3 FT |
| 6,511,266 | B1 * | 1/2003 | Groot | 408/1 R |
| 6,669,413 | B1 * | 12/2003 | Neeld et al. | 408/79 |
| 7,549,826 | B2 * | 6/2009 | Videtto | 408/1 R |
| 2006/0133902 | A1 * | 6/2006 | Brewington | 408/115 R |
| 2007/0177952 | A1 * | 8/2007 | McCracken | 408/115 B |
| 2009/0060668 | A1 * | 3/2009 | Ono et al. | 408/115 R |

FOREIGN PATENT DOCUMENTS

JP  01121113 A * 5/1989

* cited by examiner

*Primary Examiner*—Eric A Gates
(74) *Attorney, Agent, or Firm*—Thomas J. Schab

(57) ABSTRACT

An electrical safety device for use within an electrical circuit panel box and other electrical cabinetry is constructed of a tubular, transparent sleeve having a first and a second end. One end has a removable cap and the other end is provided with a means for attaching the sleeve to the interior wall surface of the electrical panel box or other electrical cabinetry. The safety device functions to catch the metallic waste material that is generated when the wall of the panel box or cabinetry is drilled to add other conduits to the panel box so that it does not penetrate any of the electrical components or wiring within the panel box. The safety device also functions to isolate the drill bit from contact with the components within the panel box. The removable cap facilitates emptying of the sleeve after use.

5 Claims, 2 Drawing Sheets

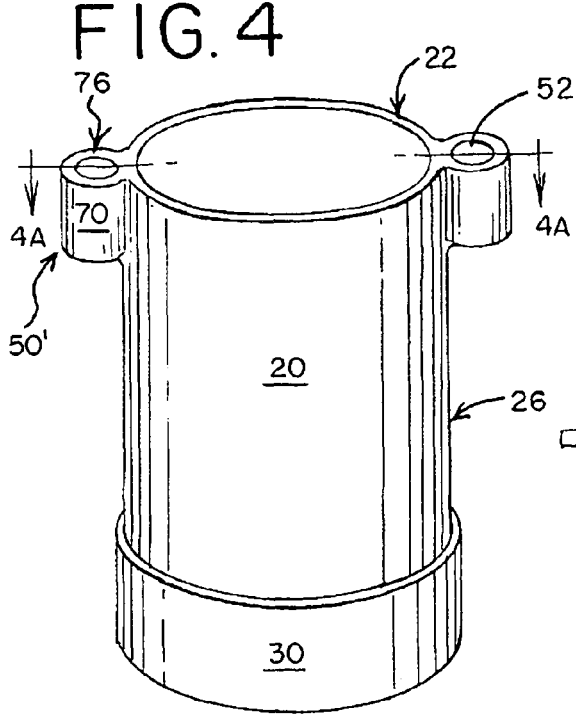
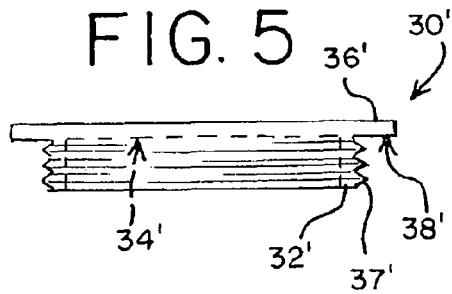
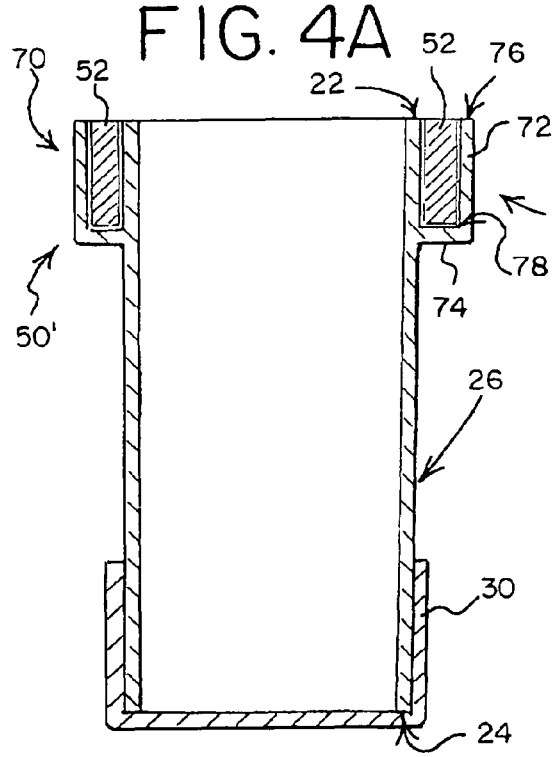
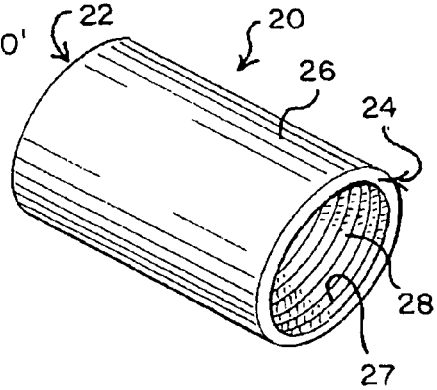

SAFETY PROTECTION DEVICE FOR ELECTRICAL CIRCUIT PANEL BOXES AND THE LIKE

BACKGROUND OF THE INVENTION

1. Field of the Invention

The present invention relates generally to electrical safety devices and more particularly to a safety protection device for use within the interior of an electrical circuit panel box. The safety device of the present invention allows a user to drill holes through a wall of an electrical panel box while simultaneously isolating himself and his drilling equipment from contact with any of the internals within the box, especially if the panel box is "live." The present invention also collects all of the metallic dust and particulate matter that is generated during drilling, thereby preventing possible arching, flashing, short circuits, fires and explosions.

2. Discussion of the Prior Art

It is well known that when drilling any material, the dust and particulate debris from the drilling operation becomes scattered over the article being drilled, the person doing the drilling, and the work site itself. Considering the numerous applications, situations, and special environments where drilling operations must be performed, the problem of controlling the dust and particulate debris can become particularly acute, especially in applications where drilling is performed within or near commercial electrical panel boxes, switchgear cabinets and circuit relay cabinets. The same can also be said to be true when drilling residential electrical panel boxes.

In commercial electrical applications, the scattering of metallic particulate debris that results from drilling metal cabinets, panel boxes and such is a serious problem. The metallic particulate waste that is generated during is usually made up of fine and course metallic dust and larger shavings that easily scatters and penetrates the most hidden places. If a circuit panel box or other type of electrical panel or cabinet must be drilled when the electrical equipment is still "live," the metallic particulate debris can contact a "live" wire or other components, thereby causing a short circuit, arcing, flashing or possibly a fire or explosion. Therefore, careful and meticulous clean up of the particulate waste matter is imperative in order to preventing these possibilities. In "live" situations, cleaning becomes even more problematic because only non-conductive tools can be used. Even when the electrical equipment to be drilled has been locked out and the power is off, controlling the metallic particulate matter is still a major concern because the dust and particulate can penetrate hidden places where clean up would be impossible. In those situations, returning the circuit panel box or electrical cabinets to the "live" condition could nevertheless result with the metallic waste matter causing the same above-mentioned problems.

Another problem that also arises while drilling electrical panel boxes and/or electrical cabinets is that as the electrician drills from his position outside the box, the drill bit will have a tendency to lunge forward in the drilling direction as the bit penetrates through the surface being drilled. Thus, there is a possibility that the drill bit can contact and destroy any of the components or wiring within the panel box or cabinetry. Furthermore, if the drilling is performed without the power being shut off, the operator of the drill can touch "live" wires or components with the drill bit, leading to electrical shock. In commercial applications, the voltages within such panels and/or cabinets are substantially higher than residential applications. Therefore, electrical shock in commercial settings usually leads to serious injury or death.

What is needed is a portable and reusable safety device for use within the interior of the electrical panel box and/or cabinet which can shield and protect against metal-to-metal contact between the drill bit and any live components during drilling and which simultaneously catches all of the metallic dust and particulate waste matter that is generated during drilling.

To date, there have been many prior art debris catching devices for use with portable electrical drills, as discussed in U.S. Pat. No. 4,955,984 to Cuevas. But these prior art devices are not readily adaptable to the specific application for use within electrical circuit panel boxes and/or electrical cabinets where the electrician must drill from outside the panel box or cabinet while the metallic waste falls inside. Furthermore, no known safety device exists which can be removably attached to the inside of such panels boxes or cabinets for catching metallic debris and for protecting the drilling operator against electrical shock should contact be made between the end of the drill bit and the live wires or other components within the panel or cabinet. In U.S. Pat. No. 6,217,006 to Muller, a device for use within a circuit panel box was presented for allowing an electrician determine when a fish tape has reached the electrical panel box after being fed from an outlet box. This device and the debris catching devices do not offer the portability, flexibility and inventive features of the present electrical safety device. As will be described in greater detail hereinafter, the safety device of the present invention differs from those previously described.

SUMMARY OF THE INVENTION

It is the primary object of the present invention to provide a portable and removable safety protection device for use within electrical panel boxes and other electrical cabinetry where some sort of drilling operation is to be performed so that the device collects all of the metallic particulate matter that is generated during drilling while simultaneously protecting the operator from inadvertent contact of the drill bit with electrical wires and other components within the panel box and/or cabinetry. The object is met in the present invention by providing a safety device that is comprised of a an open tubular sleeve having a first end and a second end, a removable cap for temporarily sealing one of said first and second ends and an attachment means secured to the other of said first and second ends for removably attaching the sleeve against an inside wall of said panel box or cabinet so that the drilling waste material falls into an interior cavity of the sleeve. The attachment means preferably comprises at least one magnet, although a double stick tape could be used. If a magnet is used, the magnet requires a carrier for holding it to the sleeve, either on one of an internal wall surface, an external wall surface, or integrally as part of said sleeve. In one version of the carrier, it is comprised of a non-conductive clamp. In another version, the carrier is formed as a pocket for holding the magnets. There may be several, spaced pockets or there may be one, continuous pocket provided at the circumference of the sleeve at its first end. The removable cap is a unitary member having a cup-shaped configuration defined by a side wall integrally formed with a bottom wall. In one version of the cap, the cap is frictionally received about an exterior wall surface of said sleeve. In another version, either an outside side wall surface or an inside side wall surface is provided with threads that engage complementary threads which would be provided on the interior wall surface of the sleeve, at the second end thereof. The present invention may also be provided with a removable sealing ring that is to be disposed between said first end of said sleeve and said inside wall of said panel box. The sealing ring is comprised of a spongy material which can deform to provide a very tight seal between the inside wall of the panel box and the sleeve so that no dust or waste matter escapes during a drilling operation. The safety device may also be provided with a removable sealing lid for enclosing the first end of said sleeve when said safety device is not in use. In this way, the internal cavity of the sleeve can be used to store drill bits that are used in the drilling process.

The features and advantages of the invention will be further understood upon consideration of the following detailed description of an embodiment of the invention taken in conjunction with the drawings, in which:

BRIEF DESCRIPTION OF THE DRAWINGS

FIG. 4 is a perspective view of the safety protection device showing a second version of the attachment means integrally formed into the tubular sleeve;

FIG. 4A is a cross sectional view of the safety protection device taken along line 4a-4a of drawing FIG. 4;

FIG. 5 is a side view of a second version of the removable cap of the safety protection device; and FIG. 6 is a perspective view of another version of the tubular sleeve which is an element of the safety protection device of the invention.

DETAILED DESCRIPTION OF A PREFERRED EMBODIMENT

Figure 1:
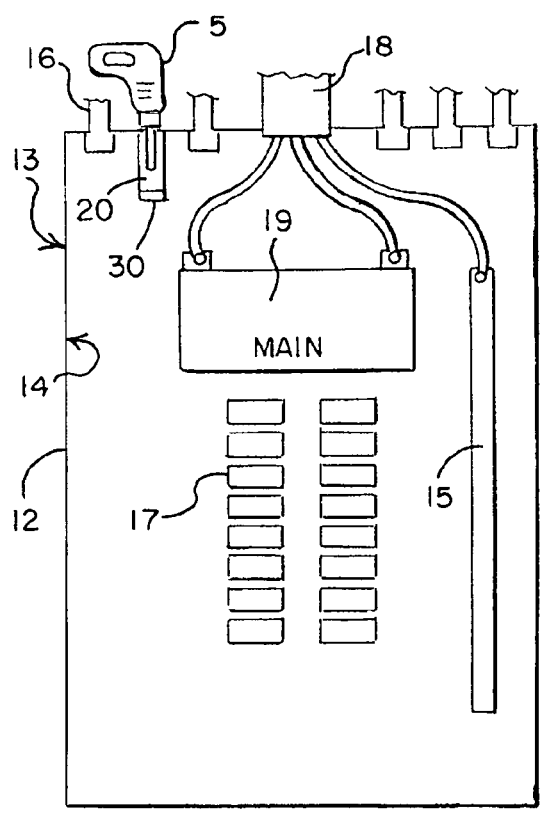
FIG. 1 is a plan view of a circuit panel box showing a safety protection device of the present invention in place during the drilling process.

Referring now to the drawings, FIG. 1 shows the new and improved safety protection device 10 being installed inside an commercial electrical circuit panel box 12 having an outside wall surface 13 and an inside wall surface 14. The present invention may also be used within residential circuit panel boxes as they have similar internal and external components as an commercial circuit panel box and because it is non-conductive, the present invention is also adaptable for use within switchgear cabinets, circuit relay cabinets, or other types of housings that contain electrical equipment. Mounted to the panel box 12 are several metal conduits 16 that contain wiring (not shown) which project inside the box and connect with the circuit breakers 17 and bus bar 15. A main conduit 18 feeds several wires 17 that connect and feed a supply of power to the main switch 19 and bus bar 15. In commercial applications, the outside wall surface 13 is drilled for the purpose of adding more conduits 16 to the panel box, where it is typical that the outside diameters of the conduits 16 will be of varying sizes, thus requiring repeated drilling applications. With a residential circuit panel box, the conduit outside diameters are usually of the same size, negating the need to constantly drill the panel box as almost all residential circuit panel boxes are provided with pre-formed, circular knockouts that are sized to accept the typically used conduit sizes. Adding more conduits to a panel box occurs throughout the construction of a new building or when an existing building is being retro-fitted with new equipment during remodeling of the building, independent of whether the work is commercial or residential in nature. In some commercial instances, adding additional conduits may even occur when the entire electrical panel box is still "alive." In any event, the present invention serves two functions when adding conduits to an electrical circuit panel box or whenever drilling must be performed on a switchgear cabinet, circuit relay cabinet, or other type of housing that contains electrical equipment that may or may not be live. The first function is that the safety device 10 protects the electrician from electrical shock as he drills holes into the wall of the particular housing. For example, FIG. 1 shows safety protection device 10 attached to the inside wall surface 14 of the panel box with the tubular sleeve 20, thereby forming a protective shield around the drill bit 5 as it penetrates the wall of the panel box 12. This shielding function not only ensures that drill bit 5 will never touch any of the wires or other electrical components during drilling so as to destroy their integrity, it also prevents inadvertent contact against a possibly live wire or component, which would certainly lead to electrical shock to the person doing the drilling. The second important function of the safety device of the present invention is that it functions to collect all of the metallic dust and particulate matter that is generated during the drilling operation. Regardless of whether the box is being drilled while live or not, an electrician must exercise exceptional care in removing all drilling matter particulate from inside the panel box or other cabinetry, otherwise, the conductive waste matter can infiltrate the wiring, circuit breakers, relays, or other hard to reach spaces. Should that happen, there is a very high probability that when the power is turned back on, the drilling particulate matter left behind will cause an electrical short circuit, which may lead to arching or flashing, which in turn, may or may not cause a fire or explosion. To prevent such catastrophes, the safety protection device of the present invention has been provided with various features which will now be described in greater detail.

The safety device of the present invention comprises an open, tubular sleeve 20, removable cap 30 for sealing one end of the sleeve, and an attachment means 50 secured to the other end of the sleeve 20 for holding the device against the inside wall surface 14 of an electrical panel box or other electrical cabinetry. The tubular sleeve 20 has a first end that is delimited by a first end surface 22, a second end that is delimited by a second end surface 24, an exterior wall surface 26 and an interior wall surface 28 that defines an internal cavity 25. It is ideal that sleeve 20 be made from a non-conductive, translucent or semi-translucent material such as plastic. In this way, the person who is drilling can look through the body of the sleeve during the drilling operation to ensure that the cavity 25 is essentially centered above the point where the drill 5 will project through the wall of the panel box. It is also preferred that the sleeve material be constructed of a plastic that is semi-deformable, although a rigid plastic could be employed, depending upon the type of application. For example, if a electrical panel box is already crowded with existing conduits and the next conduit to be added will be disposed between two conduits that have a tight spacing limitation therebetween or between a conduit and a wall of the panel box, the body of sleeve 20 should be able to deform to allow it to be inserted within such tight spaces yet still functionally perform as desired. In some applications, the need for deformability never exists, therefore a more rigid plastic material may be utilized.

Figure 2:
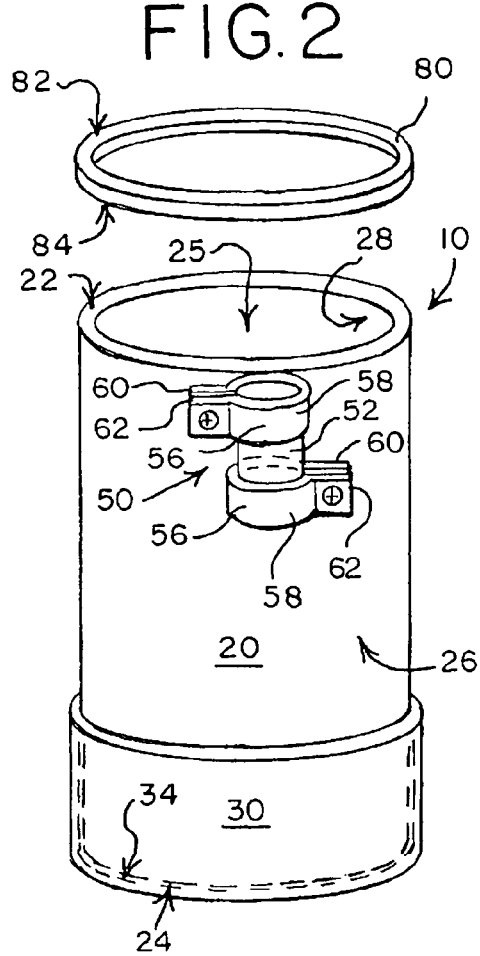
FIG. 2 is a perspective view of the safety protection device of the present invention having a first version of the attachment means attached thereto.
Figure 2A:
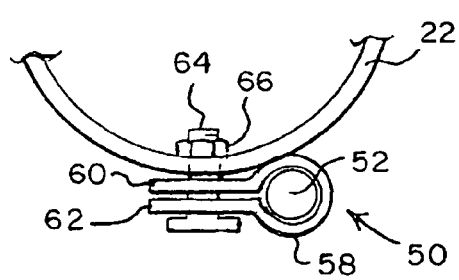
FIG. 2A is a fragmented top view of safety protection device shown in FIG. 2, highlighting the first version of the attachment means.
Figure 3:
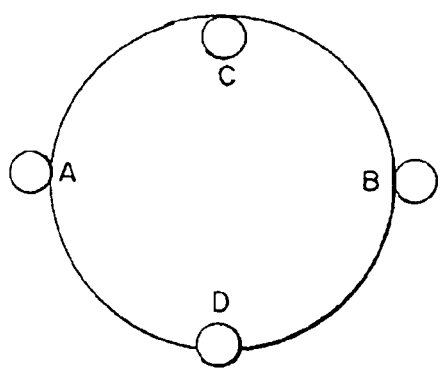
FIG. 3 is a diagramtic representation of various locations and settings for all versions of the attachment means of the safety protection device.

As FIG. 1 shows, the first end surface 22 of sleeve 20 is in abutting contact against inside wall surface 14 during the drilling operation through use of an attachment means 50. In one variation of the preferred embodiment, shown in FIG. 2, the attachment means comprises a combination of at least two magnets and a magnet carrier. A second version of the attachment means of the preferred embodiment is shown in FIG. 4 and that means will be described later. In FIGS. 2 and 2A, the carrier for holding the magnets of the attachment means 50 is shown to comprise a pair of identical clamps 56 mounted on the exterior wall surface 26. Any type of clamp for holding the magnets can be used and the invention should not be limited to only the clamp being shown and described. Each clamp 56 has a body portion 58 integrally formed with a first and second flange portion 60,62. The body portion 58 tightly envelopes the magnet 52 when the flange portions 60,62 are squeezed together. A threaded screw 64 and nut 66 combination holds the carrier to sleeve 20, as best seen in FIG. 2A, while simultaneously squeezing flanges 60,62 together. Depending upon the type of plastic chosen for the sleeve 20 and the carriers, the carriers can be plastic welded to sleeve 20, as known by those in the art. It is preferable to provide at least two attachment means at the diametric position such as "A" and "B" or "C" and "D", as shown in FIG. 3, in order to maintain substantial contact between first end surface 22 and inside wall surface 14. The invention is not to be limited by the number of attachment means being employed and as FIG. 3 shows, four such means are provided in equally spaced positions about the circumference of the circular sleeve 20. Additionally, the attachment means 50 does not have to be externally mounted on sleeve 20, rather means 50 could also be internally mounted within cavity 25 as presented with position "C." It is important to understand that the carriers shown in FIGS. 2 and 2A are made of plastic or nylon so that they are also non-conductive and that magnets 52 are preferably earth magnets in order to maximize their gripping power and effect, especially when the sleeve 20 has to be deformed in order to fit within the tight spaces inside the panel box.

In another version of the attachment means 50' as shown in FIGS. 4 and 4A, the carriers are comprised of at least two identical retainer pockets 70 that are diametrically opposed to each other. Each pocket 70 is comprised of an upstanding wall 72 and a bottom wall 74, both of which are integrally formed as part of the tubular sleeve 20. The shape of the pockets are shown as circular. However, any geometrically shaped pockets can be provided as long as they are complementary to the shape of the magnets. Each pocket 70 receives a respective magnet 52 such that the bottom of the magnet touches internal bottom surface 78 and such that it extends upwardly only to the extent that the top of the magnet is in registry or flush with the top surface 76, which is also in registry with the first end surface 22. In this way, the magnets will not project out of the pockets 70 and create a gap or space between sleeve 20 and the inside wall surface 14 of the panel box 12 for the metallic waste particulate matter and dust to escape capture. For that same reason, the carrier clamps 56 shown in FIG. 2 should also be attached to sleeve 20 such that the top of the magnets are in registry with first end surface 22. The pockets 70 are shown externally mounted although they could be positioned within cavity 25 (position "C," FIG. 3) or partially inside and outside cavity 25 such that equal portions of the upstanding wall and bottom wall are on both sides of the internal and external wall surfaces of sleeve 20 (position "D," FIG. 3). In another alternative version to the carrier pockets 70, it is envisioned that a single, integral pocket continuously encircles sleeve 20 at one of the mounting positions "A", "C" or "D". A single, circularly shaped magnet would be deposited within the continuous pocket. With a continuous pocket, one could imagine in FIG. 4A how a single, continuous pocket would extend around the upper circumferential end of the sleeve. Because that construction is readily understood, it is not shown in the drawing figures.

Turning now again to FIGS. 1 and 2, the removable cap 30 will now be described. The cap 30 is made of a same type of material as sleeve 20 for the same deformability reasons already described. It is preferable that cap 30 be a unitary member having a cup-like configuration which is defined by a side wall 32 and a bottom wall 34. The side wall 32 has an inside wall surface 39 and an outside wall surface 35. The cap 30 shown in FIG. 2 is frictionally received and fitted about the exterior wall surface 26 until second end surface 24 contacts bottom wall 34. The cap is removable so that after each drilling operation, the metallic contents which fall through cavity 25, into cap 30, can be discarded prior to the next hole to be drilled. If a sturdier, non-deformable plastic sleeve 20 is provided, the second end may be provided with threads for mating with complimentary threads on the cap 30. FIG. 6 shows sleeve 20 with internal threads 27 being formed on interior wall surface 28, although threads could have been provided on external wall surface 26 instead. When threads are provided on the second end of sleeve 20, the cap 30 will require modification, as seen in FIG. 5. There, a modified cap 30' is shown to have an annular flange 36' integrally attached to bottom wall 34.' The flange 36' also defines a flange surface 38' extending about the bottom wall 34.' This particular removable cap 30' is provided with threads 37' that are complementary to the internal threads 27 on sleeve 20 (FIG. 6), wherein threads 37' are formed on outside wall surface 35. Of course, it should be understood that the external diameter of side wall 32' will be of a predetermined size so as to properly fit within the threads 27 of the sleeve. Once threads 37' are engaged with threads 27, the annular flange surface 38' contacts second end surface 24 to seal the sleeve 20. If sleeve 20 was provided with external threading at its second end, then another type of cap 30" (not shown), would be provided with complementary threads 37" on the inside surface 39" of side wall 32". With that type of a cap, an annular flange 36" is optional The cap 30" is threadingly engaged to external threads 27 on sleeve 20 until bottom wall 34" is adjacent to second end surface 24 of sleeve 20.

In order to compensate for irregularities in the fit between the sleeve 20 and the inside wall surface 14 when the sleeve is attached thereto, an optional, removable sealing ring 80 may be provided, as shown in FIG. 2. The sealing ring 80 is made of a spongy material having a top face 82 and a bottom face 84. Bottom face 84 may be provided with a double-side tape (not shown) or a re-usable type of glue similar to the type used on office sticky note pads manufactured by the 3M corporation. In either case, face 84 adheres to first end surface 22 so that sealing ring 80 does not fall off during insertion within the panel box. Top face 82 may also be provided with a tape or reusable glue to facilitate adherence to wall surface 14.

In a second embodiment of the invention, the attachment means 50' is comprised of an annular ring of double sided tape that has a construction that is exact to that of sealing ring 80, therefore it is not shown in the drawing figures. Like the sealing ring 80, the tape would have a top face 52' which attaches directly to internal wall surface 14 and a bottom face 54' that directly attaches to first end surface 22 on sleeve 20. With this embodiment, the sealing ring 80 is not used and whenever the safety device is removed, a new tape ring 50' would have to be supplied for the next use.

Finally, it is envisioned that the present invention may be provided with a lid 90 for sealing the end of the sleeve 20 that incorporates the attachment means. By providing a sealing lid, an electrician could use the safety protection device as a storage container for carrying the various drill bits within the sleeve for later use. It is envisioned that such a lid 90 would have the same construction as the removable cap 30', which was presented in FIG. 5. Like the removable cap, a sealing lid 90 would present a side wall that is provided with threads that would mate with complementary threads provided on the interior wall surface of sleeve 20 at the end provided with the attachment means.

While the apparatus and methods described herein form a preferred embodiment of this invention, it will be understood that this invention is not so limited, and changes can be made without departing from the scope and spirit of this invention, which is defined in the appended claims.

I claim:

1. A portable safety device for use within an electrical circuit panel box or cabinet, comprising:
    an open tubular sleeve defined by a continuous wall having a first end and a second end, said tubular sleeve defining an open collection chamber extending between said ends;
    a removable, unitary cap for temporarily sealing one of said first and second ends, said unitary cap attaching to said wall of said tubular sleeve; and
    an attachment means secured to the other of said first and second ends for removably attaching said sleeve against an inside wall of said panel box or cabinet, wherein the attachment means comprises at least one magnet and at least one carrier for holding said at least one magnet, said at least one carrier comprised of a pocket defined by an upstanding wall and a bottom wall and wherein said at least one carrier is attached to said sleeve integrally as part of said sleeve, wherein said upstanding wall and said bottom wall of said pocket are integrally attached to said sleeve and wherein a respective and equal portion of each of said upstanding and bottom walls is integrally attached to both said interior and exterior wall surfaces of said sleeve.

2. The portable safety device of claim 1, wherein said pocket is a continuous pocket that encircles said sleeve.

3. The portable safety device of claim 1, wherein said removable cap is a unitary member having a cup-shaped configuration defined by a side wall integrally formed with a bottom wall.

4. A portable safety device of claim 3, wherein said cap is frictionally received about an exterior wall surface of said sleeve.

5. The portable safety device of claim 1, further including a removable sealing ring disposed between said first end of said sleeve and said inside wall of said panel box, said sealing ring comprised of a spongy material.

* * * * *